(12) United States Patent
Poon

(10) Patent No.: US 8,078,501 B2
(45) Date of Patent: Dec. 13, 2011

(54) METHOD AND APPARATUS FOR FACILITATING USER REGISTRATION IN AN ON-LINE AUCTION ENVIRONMENT

(75) Inventor: Alex Dai-Shun Poon, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/891,210

(22) Filed: Sep. 27, 2010

(65) Prior Publication Data

US 2011/0015936 A1     Jan. 20, 2011

Related U.S. Application Data

(63) Continuation of application No. 12/114,279, filed on May 2, 2008, now Pat. No. 7,831,482, which is a continuation of application No. 09/730,034, filed on Dec. 4, 2000, now Pat. No. 7,373,312.

(60) Provisional application No. 60/168,842, filed on Dec. 3, 1999.

(51) Int. Cl.
  *G06Q 30/00* (2006.01)
(52) U.S. Cl. ............................................. 705/26.1
(58) Field of Classification Search ............. 705/26, 705/27, 26.1, 26.35
  See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 3,687,256 A | 8/1972 | Jones |
| 4,412,287 A | 10/1983 | Braddock, III |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,903,201 A | 2/1990 | Wagner |
| 4,992,940 A | 2/1991 | Dworkin |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |

(Continued)

FOREIGN PATENT DOCUMENTS

CA     2253543 A1     3/1997

(Continued)

OTHER PUBLICATIONS

Christopher Guly; http://proquest.umi.com/pqdweb?did=199670371&sid=13&Fmt=3&clientId=19649&RQT=309&VName=PQD The Ottawa Citizen. Ottawa, Ont.: May 20, 1998. p. G.3.*

(Continued)

*Primary Examiner* — Mila Airapetian
(74) *Attorney, Agent, or Firm* — Schwegman, Lundberg & Woessner, P.A.

(57) ABSTRACT

A method and apparatus for facilitating a transaction in a network-based transaction facility are described. According to one embodiment, a user associated with the transaction in the network-based transaction facility is identified, and a rating is assigned to the user based on the accuracy of information submitted by the user during the transaction. If the rating exceeds a predetermined threshold, the transaction is completed.

22 Claims, 8 Drawing Sheets

U.S. PATENT DOCUMENTS

| | | | |
|---|---|---|---|
| 5,243,515 A | 9/1993 | Lee | |
| 5,258,908 A | 11/1993 | Hartheimer et al. | |
| 5,280,305 A | 1/1994 | Monroe et al. | |
| 5,280,422 A | 1/1994 | Moe et al. | |
| 5,283,731 A | 2/1994 | Lalonde et al. | |
| 5,285,383 A | 2/1994 | Lindsey et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,335,170 A | 8/1994 | Petteruti et al. | |
| 5,345,091 A | 9/1994 | Craig | |
| 5,375,055 A | 12/1994 | Togher et al. | |
| 5,383,113 A | 1/1995 | Kight et al. | |
| 5,394,324 A | 2/1995 | Clearwater | |
| 5,402,336 A | 3/1995 | Spiegelhoff et al. | |
| 5,424,944 A | 6/1995 | Kelly et al. | |
| 5,453,926 A | 9/1995 | Stroschin et al. | |
| 5,521,815 A | 5/1996 | Rose, Jr. | |
| 5,526,479 A | 6/1996 | Barstow et al. | |
| 5,592,375 A | 1/1997 | Salmon et al. | |
| 5,664,111 A | 9/1997 | Nahan et al. | |
| 5,675,784 A | 10/1997 | Maxwell et al. | |
| 5,708,780 A | 1/1998 | Levergood et al. | |
| 5,715,314 A | 2/1998 | Payne et al. | |
| 5,719,560 A | 2/1998 | Watkins | |
| 5,794,207 A | 8/1998 | Walker et al. | |
| 5,815,665 A | 9/1998 | Teper et al. | |
| 5,826,241 A | 10/1998 | Stein et al. | |
| 5,826,244 A | 10/1998 | Huberman | |
| 5,835,896 A | 11/1998 | Fisher et al. | |
| 5,845,265 A | 12/1998 | Woolston | |
| 5,850,442 A | 12/1998 | Muftic | |
| 5,905,862 A | 5/1999 | Hoekstra | |
| 5,913,040 A | 6/1999 | Rakavy et al. | |
| 6,049,785 A | 4/2000 | Gifford | |
| 6,085,176 A | 7/2000 | Woolston | |
| 6,161,099 A | 12/2000 | Harrington et al. | |
| 6,202,051 B1 | 3/2001 | Woolston | |
| 6,263,447 B1 * | 7/2001 | French et al. | 726/5 |
| 6,405,175 B1 | 6/2002 | Ng | |
| 6,449,601 B1 | 9/2002 | Friedland et al. | |
| 6,675,153 B1 | 1/2004 | Cook et al. | |
| 7,373,312 B1 | 5/2008 | Poon | |
| 2003/0195843 A1 * | 10/2003 | Matsuda et al. | 705/39 |
| 2004/0168092 A1 | 8/2004 | Adachi | |
| 2005/0033655 A1 | 2/2005 | Woolston | |
| 2005/0192896 A1 | 9/2005 | Hutchison et al. | |
| 2008/0281619 A1 | 11/2008 | Poon | |

FOREIGN PATENT DOCUMENTS

| | | |
|---|---|---|
| FR | 2658635 A1 | 8/1991 |
| JP | 10-124593 | 5/1998 |
| NL | 9300266 | 2/1993 |

OTHER PUBLICATIONS

"U.S. Appl. No. 09/730,034, Notice of Allowance mailed Jan. 10, 2008", NOAR,3 pgs.

"U.S. Appl. No. 09/730,034, Preliminary Amendment filed Oct. 31, 2007", 16 pgs.

"U.S. Appl. No. 09/730,034 Response filed Aug. 1, 2007 to Final Office Action mailed Jun. 1, 2007.", 12.

"U.S. Appl. No. 12/114,279 Notice of Allowance mailed Jul. 8, 2010", 7.

"U.S. Appl. No. 12/114,279, Non-Final Office Action mailed Dec. 17, 2009", 10.

"U.S. Appl. No. 12/114,279, Response filed Apr. 19, 2010 to Non Final Office Action mailed Dec. 17, 2009", 10 pgs.

Baumann, G. W., "Personal Optimized Decision/Transaction Program", *IBM Technical Disclosure Bulletin*., (Jan. 1995),83-84.

Business Editor, "Business Wire", *Business Editors, Persistent Software and Cysive Collaborate to Build Internet Auction Framwork, New York*, http://proquest.umi.com/pqdweb?did=44634755& sid=6& Fmt=3&clientId=19649&RQT=309&VName=PQD, (Sep. 13, 1999),1.

Guly, C, *The Ottawa Citizen.Ottawa, Ont.*, http://proquest.umi.com/pqdweb?did=199670371&sid=13&Fmt=3&clientId=19649&RQT=309&VName=PQD,(May 20, 1998),G.3.

Hess, C M., et al., "Computerized Loan Organization System: An Industry Case Study of the Electronic Markets Hypothesis", *MIS Quarterly*, vol. 18(3), (Sep. 1994),251-274.

Malone, T. , et al., "Electronic Markets and Electronic Hierarchies", *Communications of the ACM*, 14(25), (Jun. 1987),484-497.

Massimb, Marcel , "Electronic Trading, Market Structure and Liquidity", *Financial Analysts Journal*, 50(1), (Jan./Feb. 1994),39-50.

Post, D L., et al., "Application of auctions as a pricing mechanism for the interchange of electric power", *IEEE Transactions on Power Systems*, 10(3), (Aug. 1995),1580-1584.

Rockoff, T E., et al., "Design of an Internet-based system for remote Dutch auctions", *Internet Research: Electronic Networking Applications and Policy*, vol. 5(4), (Jan. 1, 1995),10-16.

Warbelow, A , et al., "Aucnet: TV Auction Network System", *Harvard Business School Case/Study*, HBVR#9-190-001, USA,(Jul. 1989),1-15.

* cited by examiner

LOCATIONS TABLE

| ZIP CODE | CITY | STATE | COUNTY NAME | COUNTY CODE | COUNTRY | AREA CODE | TIME ZONE | DAYLIGHT SAVINGS TIME FLAG | LATITUDE | LONGITUDE | CITY FLAG | SOURCE |
|---|---|---|---|---|---|---|---|---|---|---|---|---|
| 80 | 82 | 84 | 86 | 88 | 90 | 92 | 94 | 96 | 98 | 100 | 102 | 104 |

FIG. 4

| Validity Checks | Scores | Bit In Verification Detail Record |
|---|---|---|
| Does the phone number contain at least 10 digits? | -20/+0 | 1 |
| Is the area code a real area code? | -2/+2 | 2 |
| Is the zip code a real zip code? | -2/+2 | 3 |
| Does the zip code match the state? | -1/+1 | 4 |
| Does the area code match the state? | -1/+1 | 5 |
| Is the zip code within 100 miles of the area code? | -1/+1 | 6 |
| Does the zip code match the city? | -1/+1 | 7 |
| Does the area code match the city | -1/+1 | 8 |

FIG. 7

METHOD AND APPARATUS FOR FACILITATING USER REGISTRATION IN AN ON-LINE AUCTION ENVIRONMENT

RELATED APPLICATIONS

This patent application is a continuation of U.S. patent application Ser. No. 12/114,279, filed May 2, 2008 now U.S. Pat. No. 7,831,482 and entitled "Method and Apparatus for Facilitating User Registration in an On-line Auction Environment," which is a continuation of U.S. patent application Ser. No. 09/730,034 filed on Dec. 4, 2000, now U.S. Pat. No. 7,373,312, issued May 13, 2008 and entitled "Method and Apparatus for Facilitating User Registration in an On-line Auction Environment," which claims the benefit of the filing date of U.S. Provisional Application Ser. No. 60/168,842, filed Dec. 3, 1999 and entitled "Method and Apparatus for Verifying User Details Submitted During a Registration Process", the contents of which are incorporated by reference herein in their entirety.

FIELD OF THE INVENTION

The present invention relates generally to the field of online registration and, more specifically, to facilitating user registration in a network-based transaction facility such as, for example, an Internet-based auction facility.

BACKGROUND OF THE INVENTION

One of the advantages offered by a typical network-based transaction facility, such as an Internet-based auction facility, is the simplicity and promptness of its registration process. Any one who is willing to provide some basic registration information (e.g., name, address, phone number, and email address) can immediately become a participant of the facility. Having a large number of participants benefits the facility and its members. For instance, in an auction facility with a large number of sellers, buyers are presented with a larger variety of items. Similarly, sellers benefit from conducting business in an auction facility that has a large number of buyers. Accordingly, it is important to allow a large number of registrants to successfully complete the registration process and become a member of the facility.

However, access to the network-based transaction facility cannot be unlimited. Indeed, for participants of a network-based transaction facility, verification of user identity is particularly important for enhancing user trust in the transaction facility. In other words, a reasonable assurance that a trader is who he or she claims to be may be particularly valuable and useful in providing other traders with a degree of confidence regarding that specific trader and the transaction facility itself.

Therefore, it will be advantageous to maintain such a level of identity verification of new registrants as not to unnecessary limit the access to the network-based transaction facility.

BRIEF DESCRIPTION OF THE DRAWINGS

The present invention is illustrated by way of example and not limitation in the figures of the accompanying drawings, in which like references indicate similar elements and in which:

FIG. 4 is a diagrammatic representation of one embodiment of a locations table within the database;

FIG. 7 illustrates an exemplary set of verification rules; and

DETAILED DESCRIPTION

A method and apparatus for facilitating user registration in a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
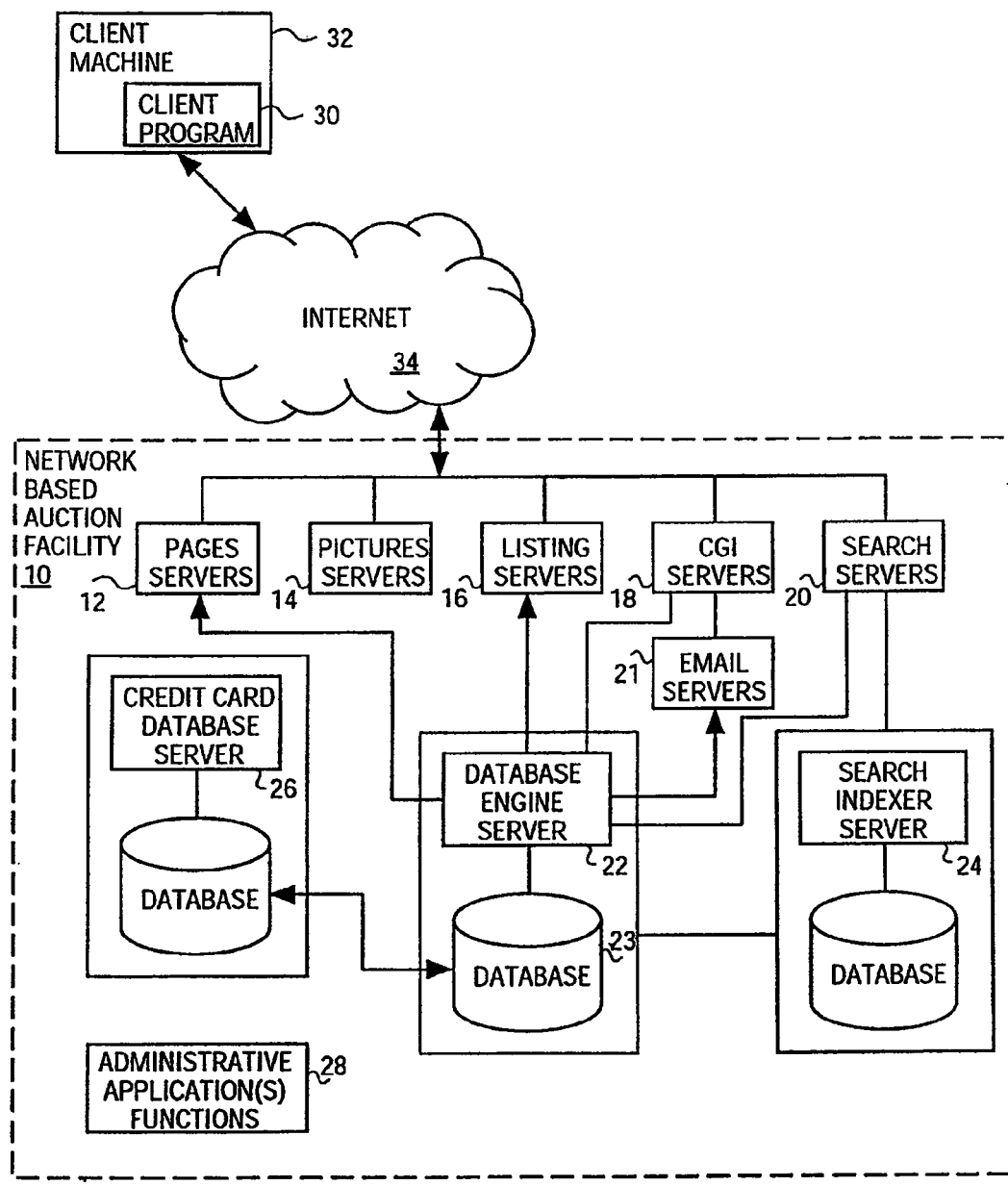
FIG. 1 is a block diagram of one embodiment of a network-based transaction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
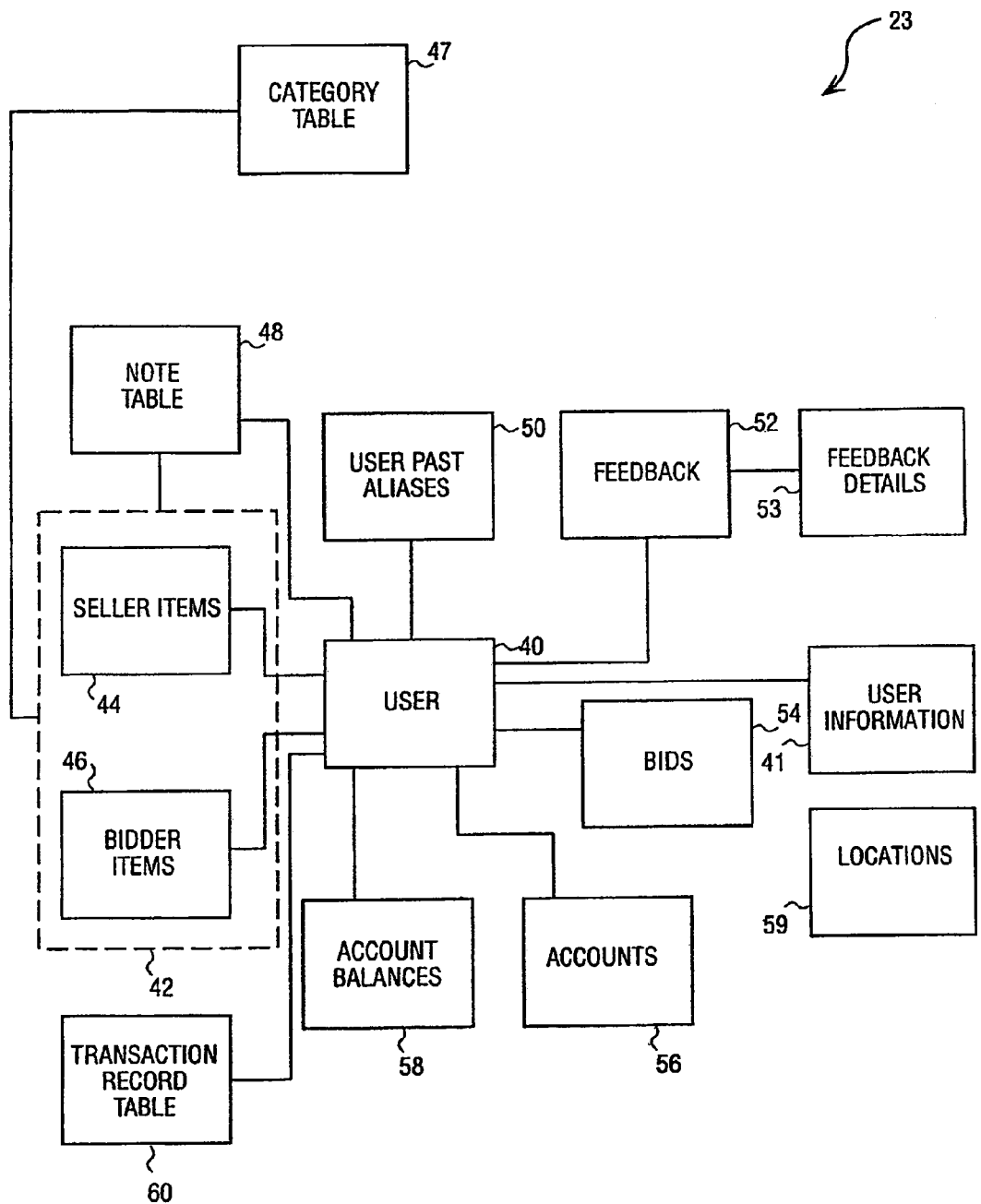
FIG. 2 is a block diagram of one embodiment of a database maintained by a database engine server.

FIG. 2 is a database diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records with the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a bids table 54, an accounts table 56, an account balances table 58 and a transaction record table 60. In addition, the database 23 includes a locations table 59 which stores valid demographic information that is used to verify registration information submitted by users during the registration process.

Figure 3:
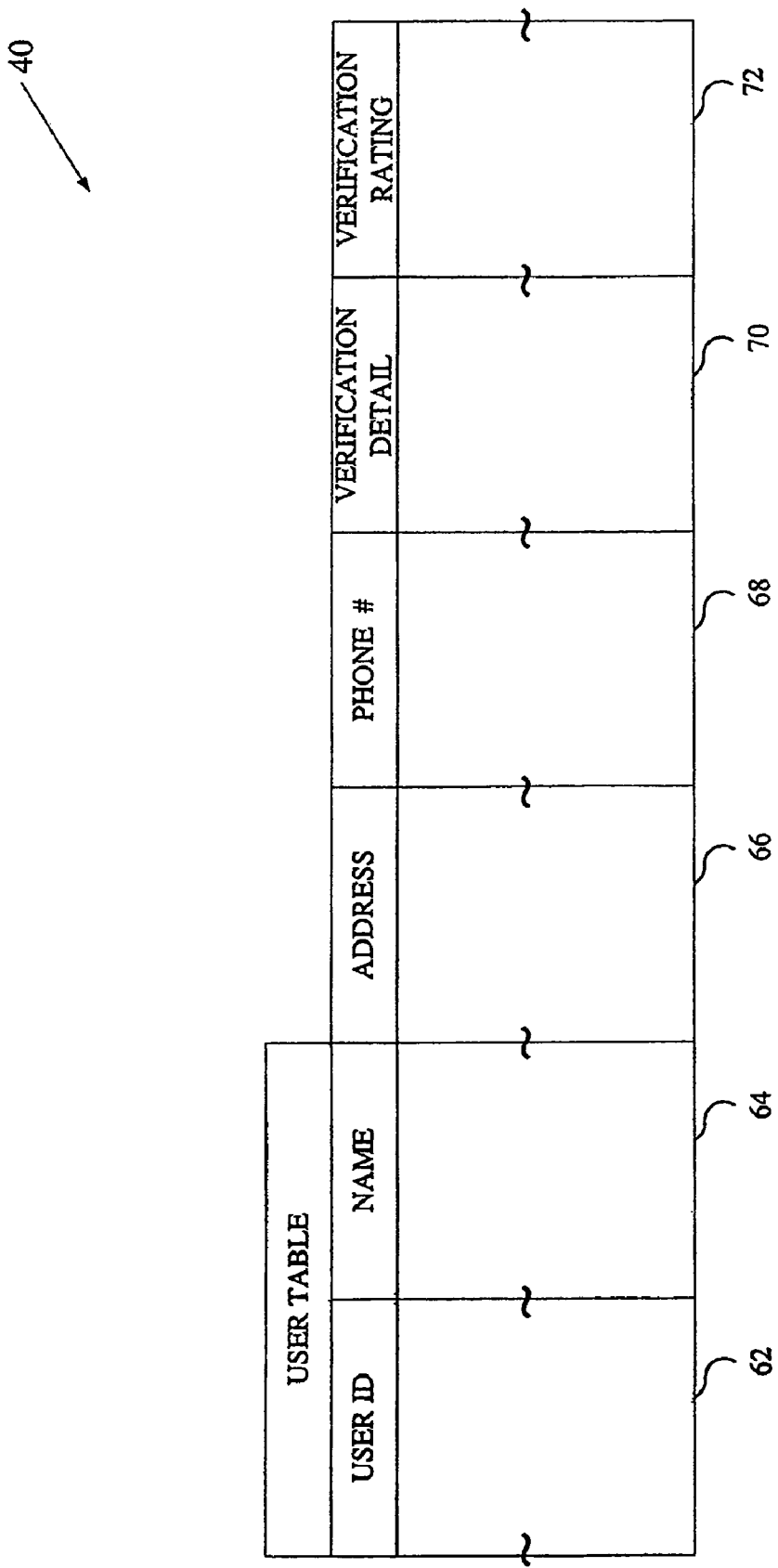
FIG. 3 is a diagrammatic representation of one embodiment of a user table within the database.

FIG. 3 is a diagrammatic representation of an exemplary embodiment of the user table 40 that is populated with records, or entries, for each user of the auction facility 10. The table 40 includes a user identifier column 62 that stores a unique identifier for each user. A name column 64 stores a first name, a middle initial and a last name for each user. An address column 66 stores full address information for each user, e.g. a street name and number, city, zip code, state, country, etc. A phone number column 68 stores a home phone number for each user. A verification detail column 70 stores, for each user, a set of scores pertaining to the accuracy of registration information submitted by the user during the registration process. Each score within the set characterizes a result of a validity check performed on a certain piece of the registration information. A verification rating column 72 stores a total score assigned to the user based on the set of scores contained in the verification detail column 70.

It will be appreciated that any information other than that described above may populate the user table 40 without loss of generality.

FIG. 4 is a diagrammatic representation of an exemplary embodiment of the locations table 59. The locations table 59 stores a list of current zip codes and associated location information. In one embodiment, the data stored in the locations table 59 is imported from a commercial database and is periodically completely re-populated with a new release of the commercial database. Alternatively, the data stored in the locations table 59 is obtained from various sources including various commercial databases and/or the auction facility 10 itself. The table 59 includes a zip code column 80 that stores a list of current zip codes in the U.S. and abroad. Each zip code corresponds to valid city information stored in a city column 82. A flag stored in a column 102 indicates whether the city information stored in the column 82 is for a main city or an alias city. The zip code information stored in the column 80 is also correlated with area code information stored in an area code column 92 and with other location information stored in a state column 84, county name column 86, county code column 88, country column 90, time zone column 94, latitude column 98, and longitude column 100. A column 95 includes a flag indicating, for each entry, whether daylight savings time is adopted in this geographic area. A source column 104 stores a value indicating the source of the record, i.e., whether the recorded was imported from a certain commercial database, created by an administrator of the auction facility 10, or was originated by other source.

It will be appreciated that other demographic information may also populate. The locations table 59.

Registration Process

As discussed above, a network-based transaction facility such as the auction facility 10 should maintain such a level of identity verification of new users during the registration process as not to unnecessary limit access to the facility. One embodiment of the present invention proposes a method and apparatus whereby an applicant is registered with an auction facility if the auction facility obtains a reasonable assurance of the applicant's identity. While the present invention is discussed within the environment of the auction facility 10, it will readily be appreciated that the present invention may be extended to providing identity verification in other environments including network-based transaction facilities (e.g., business-to-business, business-to-consumer and consumer-to-consumer Internet marketplaces and retailers) and on-line communities.

Figure 5:
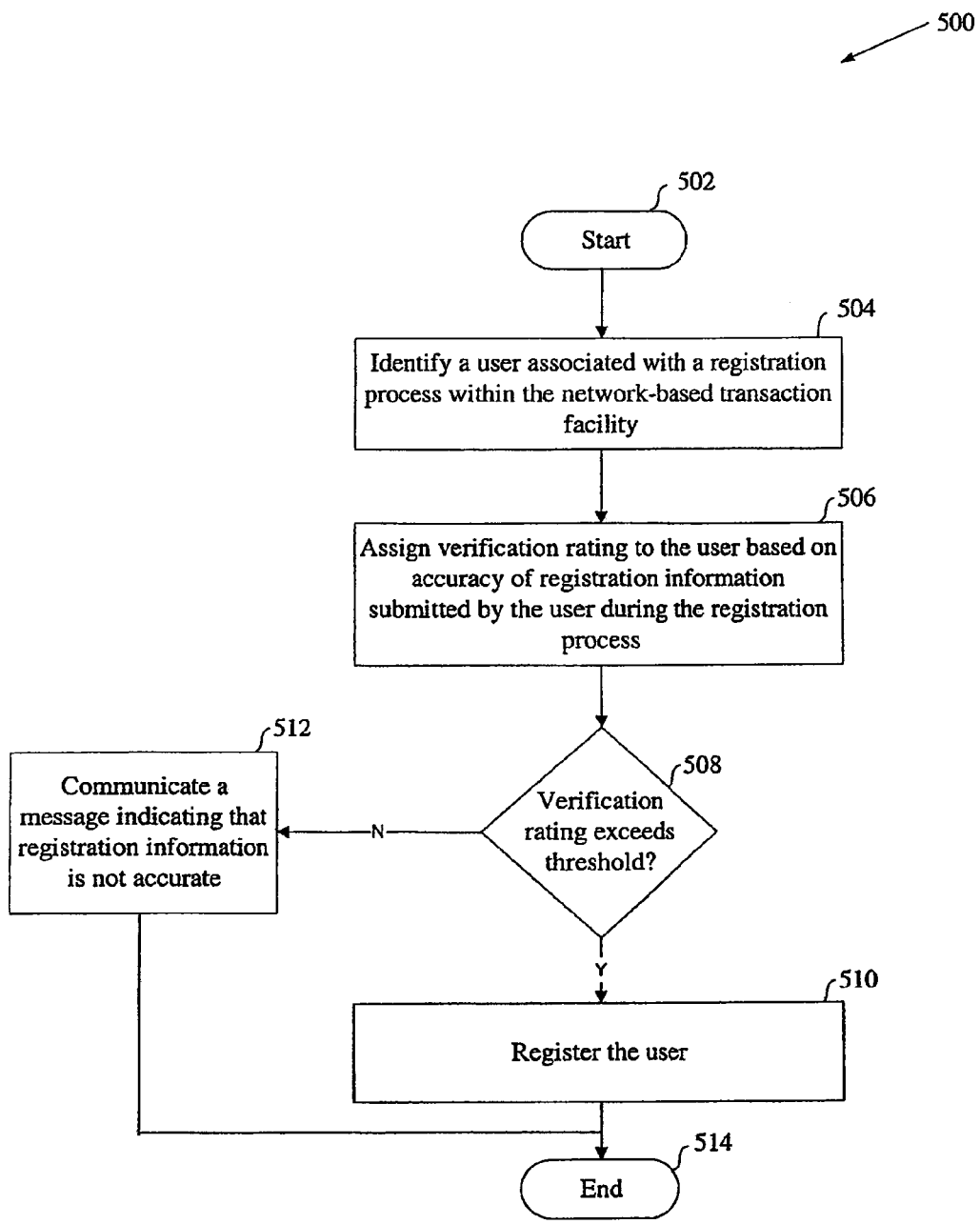
FIG. 5 is a flow diagram of one embodiment for a method of facilitating a registration process in a network-based transaction facility.

FIG. 5 is a flow diagram of a method 500 for facilitating a registration process in a network-based transaction facility, according to an exemplary embodiment of the present invention, that may be implemented by the auction facility 10. The method 500 commences with identifying a user associated with a registration process within the network-based transaction facility (processing block 504). In one embodiment, the user associated with the registration process is identified upon receiving a user request to register. Then, a registration interface is communicated to the user to obtain the user's registration information. The registration information may include, for example, the user's name, address, phone number, email address, etc.

At processing block 506, the user is assigned a verification rating based on the accuracy of the registration information submitted by the user. The verification rating may be assigned during registration of a new user or at the time when an existing user attempts to change his or her registration information. In one embodiment, the verification rating is assigned using demographic information stored in the locations table 59 of the database 23. Specifically, the locations table 59 is searched to find data matching various portions of the user's registration information. One embodiment of a method for assigning a verification rating to a user is described in greater detail below in conjunction with FIG. 6.

At decision box 508, a determination is made as to whether the assigned verification rating exceeds a predetermined threshold. The value of the predetermined threshold may vary depending on various factors including the size of the transaction facility, its type and manner of operation, etc. For instance, the threshold may be initially set to a lower value and then be increased as a transaction facility grows in size. Similarly, the threshold may be set to a higher value if participants of the transaction facility are companies and organizations rather than individuals. By varying the threshold value, the transaction facility can control access restrictions for new registrants.

If the verification rating assigned to the user exceeds the predetermined threshold, the user is registered with the transaction facility (processing block 510). Alternatively, a message may be communicated to the user indicating that the registration information is not accurate (processing block 512). For instance, an inaccurate portion of the registration information may be marked as incorrect, or a message asking the user to double check provided information may appear next to the inaccurate information. The user may then be allowed to resubmit the corrected information which will be processed as described above.

Figure 6:
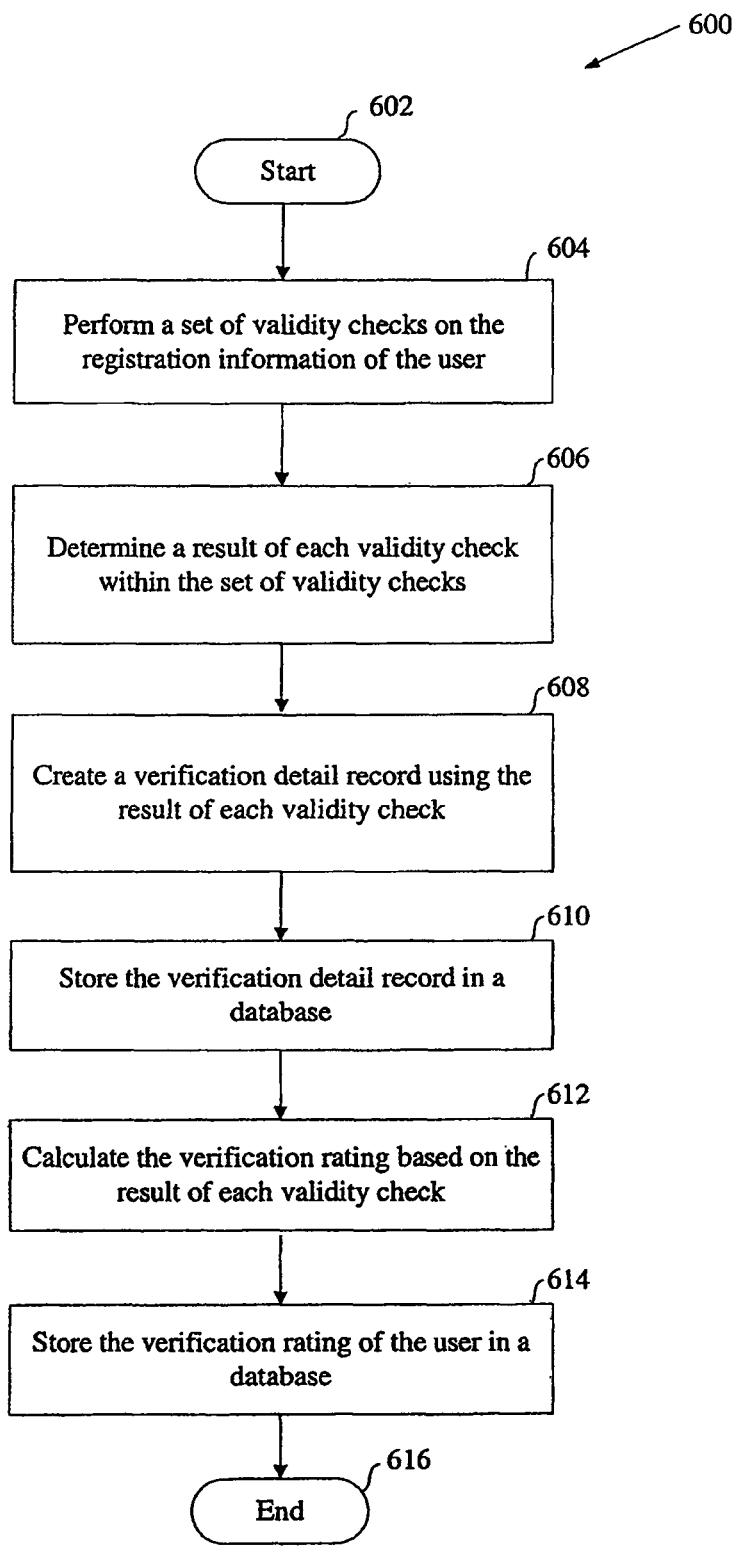
FIG. 6 is a flow diagram of one embodiment for a method of assigning a verification rating to a user.

FIG. 6 is a flow diagram of one embodiment for a method 600 of assigning a verification rating to a user. The method 600 commences with performing a set of validity checks on the user's registration information (processing block 604). In one embodiment, each of these validity checks verifies the accuracy of certain demographic data within the registration information. Specifically, a validity check may determine whether the format of the phone number provided by the user is correct or whether the address or phone information provided by the user appears to be accurate. In one embodiment, the accuracy of the address and phone information is tested using the locations table 59 which stores valid demographic information (i.e., a list of existing zip codes correlated with valid area codes and location information). For instance, a validity check may verify whether an area code or zip code provided by the user is valid by matching the area code or zip code with the data stored in the locations table 59. Additionally, some validity checks may verify whether the zip code, area code, city and state provided by the user properly correlate with each other using valid demographic data stored in the locations table 59.

At processing block 606, the result of each validity check performed on the user's registration information is determined. In one embodiment, the result is represented by a numerical score indicating whether a corresponding validity check has passed or failed. In one embodiment, a set of verification rules is used to define what validity checks to perform and how to translate the performed validity checks into numerical scores. An exemplary set of verification rules is illustrated in FIG. 7 which will be described in greater detail below.

Further, a verification detail record is created using the results of the performed validity checks (processing block 608) and stored in a database, e.g., in the user table 52 of the database 23 (processing block 610). The verification detail record contains information identifying the resulting score of each validity check performed on the user registration information.

Afterwards, a verification rating is calculated (processing block 612) and stored in a database, e.g., in the user table 52 of the database 23 (processing block 614). The verification rating is a total of all the scores resulting from performing the validity checks on the user registration information. The verification rating and verification detail record may be updated each time the user modifies his or her registration information. In one embodiment, the verification rating and verification detail record is accessible only internally (e.g., by customer support or billing personnel of the transaction facility). Alternatively, this information may also be accessible by other users of the transaction facility.

FIG. 7 illustrates an exemplary set of verification rules used to verify user registration information. Each verification rule defines a validity check (column 702), a score for passing the validity check and a score for failing the validity check (column 704), and location of a resulting score with the verification detail record (column 706). For instance, when the validity check verifying the format of the phone number is performed, the number of digits in the phone number is calculated. If the phone number contains 10 digits or more, the first bit of the verification detailed record will store the value of 0, which indicates that the above test has passed. Similarly, when the check verifying the validity of the area code provided by the user is performed, the locations table 59 of the database 23 is searched. If the user's area code matches an area code in the locations table 59, the second bit of the verification detail record will store the value of 2. Otherwise, if no matching area code is found, the second bit will store the value of −2, thereby indicating that the area code validity check has failed. When the validity checks are performed, their scores are added to calculate the verification rating. This verification rating is then used to determine whether the user should be allowed to register or not. Specifically, the user will be allowed to register only if the verification rating exceeds a predefined threshold.

It should be noted that a wide variety of other validity checks and associated scores may be used to verify the accuracy of the user's registration information.

Computer Architecture

Figure 8:
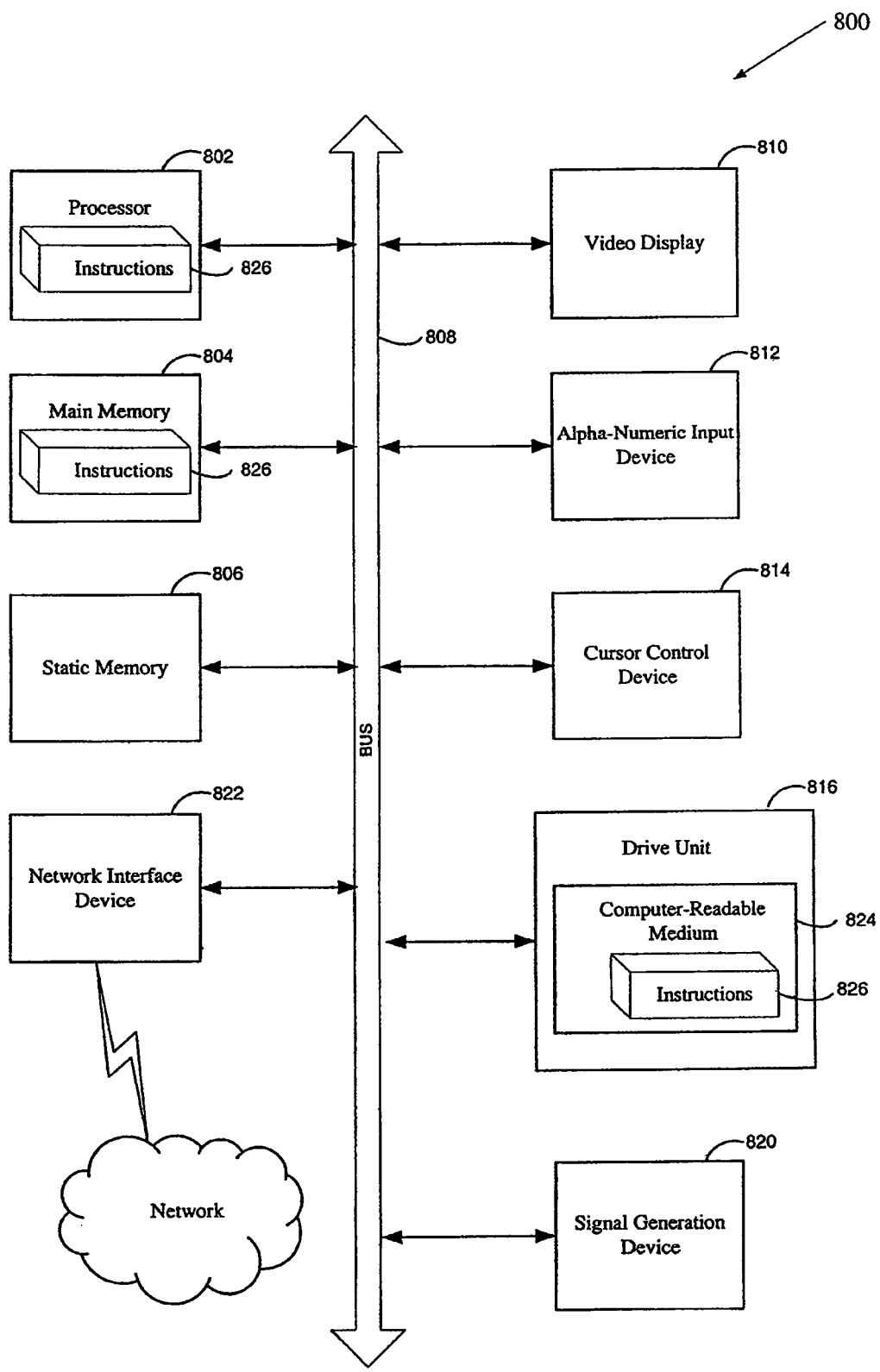
FIG. 8 is a block diagram of one embodiment of a computer system.

FIG. 8 shows a diagrammatic representation of machine in the exemplary form of a computer system 800 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 820 (e.g., a speaker) and a network interface device 822.

The disk drive unit 816 includes a computer-readable medium 824 on which is stored a set of instructions (i.e., software) 826 embodying any one, or all, of the methodologies described above. The software 826 is also shown to reside, completely or at least partially, within the main memory 804 and/or within the processor 802. The software 826 may further be transmitted or received via the network interface device 822. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for facilitating user registration in a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   identifying a user associated with a transaction within a network-based transaction facility;
   assigning, using a processor, a rating to the user based on accuracy of information submitted by the user during the transaction; and
   completing the transaction with the network-based transaction facility based on the rating exceeding a predetermined threshold value that is variable.

2. The method of claim 1, wherein the assigning of the rating occurs in real-time.

3. The method of claim 1, wherein the assigning of the rating occurs when an attempt is made by the user to perform the transaction.

4. The method of claim 1, further comprising assigning a rating when the user modifies registration information previously submitted by the user.

5. The method of claim 1, wherein the transaction is a registration process to become a member of the network-based transaction facility, the information being registration information.

6. The method of claim 1, wherein assigning the rating further comprises:
   performing a set of validity checks on the information of the user;
   determining a result of each validity check within the set of validity checks; and
   calculating the rating based on the result of each validity check.

7. The method of claim 6, further comprising:
   utilizing a set of verification rules to define the set of validity checks; and
   translating the result of each validity check into a numerical score.

8. The method of claim 7, wherein the calculating of the rating comprises summing all numerical scores resulting from the set of validity checks.

9. The method of claim 7, wherein the numerical score is negative when the validity check fails.

10. The method of claim 6, further comprising:
    creating a verification detail record using the result of each validity check; and
    storing the verification detail record in a database.

11. The method of claim 1, further comprising:
    maintaining a database of valid demographic information; and
    determining whether demographic information entered by the user matches any of the valid demographic information from the database to determine the rating to assign the user.

12. A non-transitory computer-readable medium that stores instructions, which when executed by a processor of a machine, cause the machine to perform operations comprising:
    identifying a user associated with a transaction within a network-based transaction facility;
    assigning, using the processor, a rating to the user based on accuracy of information submitted by the user during the transaction; and
    completing the transaction with the network-based transaction facility based on the rating exceeding a predetermined threshold value that is variable.

13. The non-transitory computer-readable medium of claim 12, wherein the assigning of the rating occurs in real-time.

14. The non-transitory computer-readable medium of claim 12, wherein the assigning of the rating occurs when an attempt is made by the user to perform the transaction.

15. The non-transitory computer-readable medium of claim 12, further comprising assigning a rating when the user modifies registration information previously submitted by the user.

16. The non-transitory computer-readable medium of claim 12, wherein the transaction is a registration process to become a member of the network-based transaction facility, the information being registration information.

17. The non-transitory computer-readable medium of claim 12, wherein the assigning of the rating further comprises:
    performing a set of validity checks on the information of the user;
    determining a result of each validity check within the set of validity checks; and
    calculating the rating based on the result of each validity check.

18. An apparatus comprising:
    means for identifying a user associated with a transaction within a network-based transaction facility;
    means for assigning, using a processor, a rating to the user based on accuracy of information submitted by the user during the transaction; and
    means for completing the transaction with the network-based transaction facility based on the rating exceeding a predetermined threshold value that is variable.

19. The method of claim 1, wherein the predetermined threshold value is varied to control access restrictions for the user.

20. A method comprising:
    identifying a user associated with a transaction within a network-based transaction facility;
    assigning, using a processor, a rating to the user based on accuracy of information submitted by the user during the transaction, the assigning comprising:
       performing a set of validity checks on the information of the user;
       determining the result of each validity check within the set of validity checks;
       translating the result of each validity check into a numerical score, the numerical score being negative when the validity check fails; and
       calculating the rating based on the result of each validity check.

21. The method of claim 20, further comprising utilizing a set of verification rules to define the set of validity checks.

22. A non-transitory computer-readable medium that stores instructions, which when executed by a processor of a machine, cause the machine to perform operations comprising:
    identifying a user associated with a transaction within a network-based transaction facility;

assigning a rating to the user based on accuracy of information submitted by the user during the transaction, the assigning comprising:
  performing a set of validity checks on the information of the user;
  determining the result of each validity check within the set of validity checks;
  translating the result of each validity check into a numerical score, the numerical score being negative when the validity check fails; and
  calculating the rating based on the result of each validity check.

* * * * *